United States Patent [19]

Keck

[11] Patent Number: 4,793,636
[45] Date of Patent: Dec. 27, 1988

[54] APPARATUS FOR JOINING HOSES WITH CONNECTING PIECES

[76] Inventor: Hermann W. Keck, Blauenstrasse 13, CH 4106 Therwil/BL/Schweiz, Switzerland

[21] Appl. No.: 941,427

[22] Filed: Dec. 15, 1986

[30] Foreign Application Priority Data

Dec. 16, 1985 [CH] Switzerland ............... 05334/85

[51] Int. Cl.⁴ ............................................. F16L 21/04
[52] U.S. Cl. ..................................... 285/12; 285/356; 285/360
[58] Field of Search ................. 285/360, 12, 356, 174

[56] References Cited

U.S. PATENT DOCUMENTS

| | | | |
|---|---|---|---|
| 242,564 | 6/1881 | Sholder | 285/360 X |
| 641,846 | 1/1900 | Davenport et al. | 285/360 X |
| 1,195,433 | 8/1916 | Bailey | 285/360 |
| 1,202,506 | 10/1916 | Galloway | 285/12 X |
| 1,383,127 | 6/1921 | Kraft | 285/12 |
| 1,591,871 | 7/1926 | Heinrich | 285/360 X |
| 1,937,982 | 12/1933 | Rudolph | 285/12 X |
| 2,076,918 | 4/1937 | Robison | 285/174 X |
| 2,159,811 | 5/1939 | Leonardo | 285/12 |
| 3,731,954 | 5/1973 | Haglund | 285/12 |
| 3,776,577 | 12/1973 | Dickey | 285/356 X |
| 4,345,783 | 8/1982 | Bergstrand | 285/12 |

FOREIGN PATENT DOCUMENTS 214239 7/1941 Switzerland ............... 285/356

Primary Examiner—Thomas F. Callaghan
Attorney, Agent, or Firm—Sixbey, Friedman, Leedom & Ferguson

[57] ABSTRACT

The inventive apparatus permits the connection of hoses to connecting pieces, which have a threaded, a ribbed, or a smooth end.

The apparatus comprises three parts, namely the threaded part 1, the hose part 2 and the locking ring 3. The threaded part 1 always remains firmly connected to the connecting piece and thus shields its outer surface (particularly in the case of glass parts) against damage. The hose part 2 always remains connected to the hose. By brief turning, e.g., to the right, the two parts can be firmly connected by means of bosses 5 and slots 4 having mutually engageable serrations, but can be easily detached again by briefly turning in the opposite direction, e.g., to the left.

Connecting pieces having non-threaded outer surfaces, i.e, with ribbed or smooth ends, can be fixed and sealed in the threaded part 1 by means of an O-ring or hose portion pressed between the locking ring 3 and the threaded part 1. Thus, hoses and different types of connecting pieces can be joined together and then easily detached again.

7 Claims, 2 Drawing Sheets

APPARATUS FOR JOINING HOSES WITH CONNECTING PIECES

BACKGROUND OF THE INVENTION

The present invention relates to an apparatus for connecting hoses with connecting pieces, made from glass, plastic, metal or other rigid materials, having either a threaded, a ribbed or a smooth end.

Apparatuses are already known which join hoses to connecting pieces. It used to be standard practice to slip the hoses directly onto ribbed or smooth ends of connecting pieces, which often led to difficulties. If it was wished to remove the hose again after a long time, it was usually found to be firmly stuck. In the case of such manipulations required to unstick the hose, in the case of connecting pieces formed of glass, in particular, frequently the piece shattered or broken off leading to injuries. For safety reasons, certain connecting pieces were then provided with threads onto which can be screwed a screw cap with a ribbed hose-connecting end. The screw cap is removed when the hose is disconnected so that the connecting piece thread is exposed and, therefore, unprotected. Thus, glass threads are susceptible to damage during handling or storage in a drawer or drier. If cracks occur in the glass or parts break off, the thread no longer gives a tight closure. The then necessary repair to the glass threads is costly and time-consuming. In addition, such screw caps with hose connections can only be used on connecting pieces which also have a thread screw. In the case of connecting pieces with ribbed or smooth ends, which are still very widely used, said known screw caps are not usable.

SUMMARY OF THE INVENTION

The object of the present invention is to provide an apparatus that does not suffer from the aforementioned disadvantages of the prior art.

According to the invention this problem is solved by an apparatus of the aforementioned type wherein for protecting the connecting piece (particularly glass connecting pieces), a threaded part is provided which always is firmly connected therewith and has upwardly sloping slots in which engage the bosses of a hose-connecting part, which is always to be firmly connected to the hose by connecting of the threaded part with the hose-connecting part a close, tight connection is formed. As a result of a briefly turning to the left, the threaded part and hose-connecting part can easily be separated again.

The particularly advantageous characteristics of the present apparatus are that it can be used for joining hoses to connecting pieces, irrespective of whether the connecting pieces have a threaded, a ribbed or a smooth end.

In the case of the apparatus according to the invention, the hose part and threaded part can easily be separated, and the threaded part can always remain firmly connected to the connecting piece. Due to the fact that the threaded part firmly surrounds the glass connecting pieces, the latter are protected against damage. Thus, they remain able to form tight connections and expensive repairs are avoided.

Since the hose-connecting part always remains firmly connected to the hose, the hose only has to be fixed thereto once and then never has to be detached again. This facilitates connection and increases the safety of handling.

By means of the threaded part, the apparatus according to the invention can be screwed onto all threaded connecting pieces. Corresponding threaded parts are available for different threads and all of these fit the same hose connecting part. The inventive apparatus can be used for connecting pieces with different threads by merely replacing the threaded part.

Connecting pieces having ribbed or smooth ends, instead of a threaded end, can be joined to hoses by means of the inventive apparatus by additionally using a locking ring and a rubber O-ring or a rubber hose portion, preferably a silicone rubber hose.

BRIEF DESCRIPTION OF THE DRAWINGS

The invention is described in greater detail hereinafter relative to non-limitative embodiments and the attached drawings, wherein show.

DETAILED DESCRIPTION OF THE INVENTION

Figure 1:
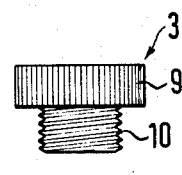
FIG. 1 is a side view of the locking ring.
Figure 2:
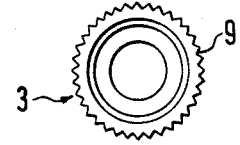
FIG. 2 is a top view of the locking ring of FIG. 1.
Figure 3:
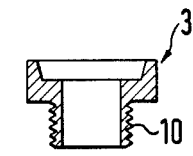
FIG. 3 is a cross-sectional view of the locking ring.
Figure 4:
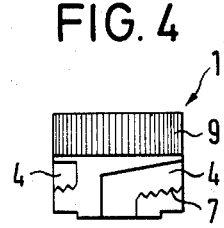
FIG. 4 is a threaded part viewed from the side.
Figure 5:
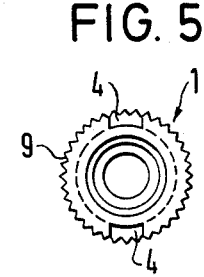
FIG. 5 is a threaded part viewed from above.
Figure 6:
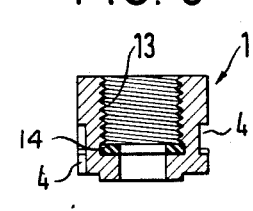
FIG. 6 is a cross-sectional view of the threaded part.
Figure 7:
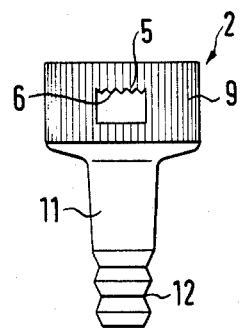
FIG. 7 is a hose-connecting part viewed from the side.
Figure 8:
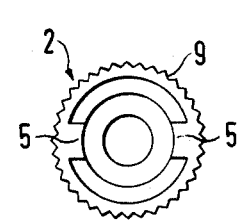
FIG. 8 is a view of the hose-connecting part from above.
Figure 9:
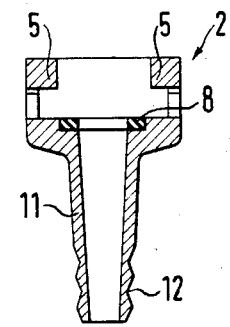
FIG. 9 is a cross-sectional view of the hose part.
Figure 10:
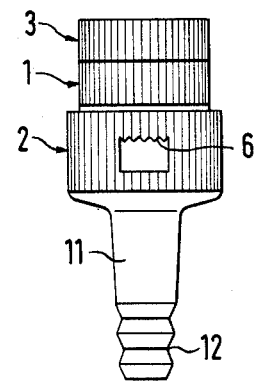
FIG. 10 is a side view of the three parts joined together in a downward order of the locking ring, threaded part and hose-connecting part.
Figure 11:
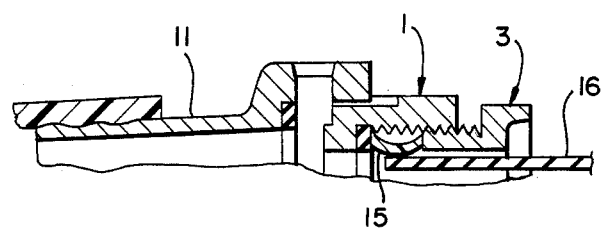

In order to join a hose with a threaded connecting piece (not shown), the hose is placed over the ribbed end (12) of conically tapering coupling portion (11) of a hose-connecting part (2), in which is located a flat gasket ring (8). A separate threaded part (1) is provided with the flat gasket ring (14) and has internal threading by means of which it may be firmly screwed on to a matching threading of a connecting piece.

The hose-connecting part (2) and threaded part (1), attached to a hose and connecting piece, respectively, are then assembled by engaging a boss (5) of the hose-connecting part (2) in a slot 4 of the threaded part 1. After a brief relative counter rotation of these parts (1, 2) the serrated surface (6) of the boss (5) engages the serrated surface (7) of the slot (4) of the threaded part (1). Thus, even in the case of vibrations, there can be no automatic detachment of threaded part (1) and hose part (2). Thus, the inventive apparatus ensures a firm, tight connection of hoses to connecting pieces. By briefly turning the hose part (2), it can easily be detached from the threaded part (1), which remains firmly connected to the connecting piece.

For joining a hose to a connecting piece having a ribbed or smooth end, instead of a threaded end, a locking ring (3) is initially guided over the end of the connecting piece. A rubber O-ring or a hose portion 15, preferably of silicone rubber, is then placed over the smooth or ribbed end of the connecting piece 16 and both are inserted into the threaded part (1) and the locking ring (3) is then screwed into the threaded part (1) until firm resistance is encountered. As a result the O-Ring or hose portion 15 is compressed between the threaded part (1) and the locking ring (3), so that the hose part or O-ring is pressed against the ribbed or smooth end of the connection piece 16. Thus, the end of the connecting piece 16 is held securely in threaded part (1) and sealed. Then, as described hereinbefore, hose part (2) is joined to threaded part (1), giving a firm, tight connection between the hose and the connecting piece, although ready detachment thereof is still possible.

What is claimed is:

1. An apparatus for selectively joining a hose to rigid connecting pieces having an end portion with any of threaded, ribbed or smooth type outer surfaces, said apparatus being composed of:
   (A) a first part having a cylindrical boring with a first gasket ring seated therein, one end of said first part being internally threaded and an opposite end having external slots, each of which has an entry portion that connects with a locking portion that slopes circumferentially toward said one end;
   (B) a second part having a boring with a second gasket ring seated therein, radially inwardly directed bosses being provided at one end of the second part which are lockingly engageable in said external slots of the first part for fixing said second end of the first part against said second gasket ring, and a hose coupling portion for mounting a hose at a second end;
   (C) a third part having a cylindrical shape and an internal boring, one end of said third part having an external threading that is matched to the internal threading of said first part;
   (D) a fourth part comprising an annular compressible seal means; wherein said first and second parts are operable by themselves as a means for joining of a hose mounted to said hose-coupling portion of the second part to an end portion of a connecting piece having a threaded outer surface matched to the internal threading of the first part by a threading-in of the connecting piece into engagement with the first gasket ring; and wherein said third and fourth parts are operable in conjunction with said first and second parts as a means for joining of a hose mounted to said hose-coupling portion to an end portion of a connecting piece having a type of outer surface other than a threaded one, said fourth part being pressed against the outer surface of the connecting piece by being compressed between said first and third parts.

2. Apparatus according to claim 1, wherein the bosses of the second part and the slots of the first part have mutually engageable serrations for preventing disengagement of the first and second parts due to vibrations.

3. Apparatus according to claim 1, wherein the entry portion is axially directed.

4. Apparatus according to claim 1, wherein said hose-coupling portion of the second part tapers conically away from said one end and is provided with circumferential ribs for ensuring a better securement of a hose thereto.

5. Apparatus according to claim 1, wherein said seal means is made of silicon rubber.

6. Apparatus according to claim 5, wherein said seal means is comprised of a hose segment.

7. Apparatus according to claim 1, wherein said seal means is comprised of a hose segment.

* * * * *